United States Patent

Von Castelmur

[15] 3,681,383

[45] Aug. 1, 1972

[54] 2-PHENYLPYRAZALINONES AND PROCESS THEREFOR

[72] Inventor: Hans Von Castelmur, Basel, Switzerland

[73] Assignee: Solco Basel, AG, Basel, Switzerland

[22] Filed: July 8, 1969

[21] Appl. No.: 840,031

[30] Foreign Application Priority Data

July 12, 1968  Switzerland ................10459/68

[52] U.S. Cl.............260/310 A, 424/273, 260/465 D
[51] Int. Cl..............................................C07d 49/16
[58] Field of Search...................................260/310 A

[56] References Cited

UNITED STATES PATENTS 3,087,933  4/1963  Matter et al. .............260/310 A

OTHER PUBLICATIONS

JACS vol. 66; 1849–1855 (1944), Weissberger et al.
Synthetic Methods of Organic Chemistry, W. Theilheimer Vol. 11; 185–186 (1957).

*Primary Examiner*—Henry R. Jiles
*Assistant Examiner*—S. D. Winters
*Attorney*—Wenderoth, Lind & Ponack

[57] ABSTRACT

Novel analgesic and antiphlogestic 2-phenylpyrazolinones of the formula (I)

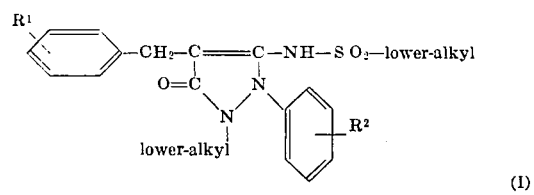

in which $R^1$ and $R^2$ may be identical or different and each denotes a hydrogen atom or halogen atom or a hydroxy, lower alkyl or lower alkoxy group or alkali metal salts thereof are made by condensing a benzylcyanoacetic ester having the formula (II):

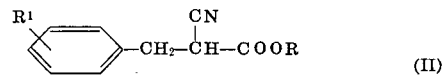

in which $R^1$ has the above meaning and R denotes a lower alkyl radical with a hydrazine derivative having the formula (III):

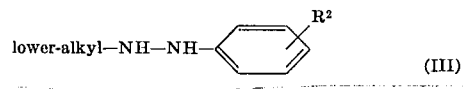

in which $R^2$ has the above meaning and reacting the condensation product in the presence of a basic condensing agent with a lower alkanesulphonyl halide.

8 Claims, No Drawings

2-PHENYLPYRAZALINONES AND PROCESS THEREFOR

Acid sulphonamides having the formula:

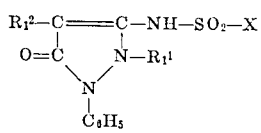

in which $R_1^1$ denotes lower alkyl, phenyl or benzyl;
$R_1^2$ denotes hydrogen, lower alkyl, cycloalkyl, phenyl or benzyl;
X denotes lower alkyl, phenyl, tolyl or benzyl, and a process for their production are described in U.S. Pat. specification No. 3,087,933. As pyrazolone derivatives, the compounds have analgesic and antiphlogistic properties.

We have now found that surprisingly when a benzyl-cyanoacetic ester having the formula (II):

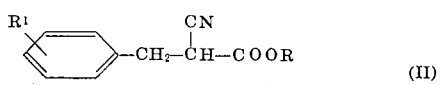

in which $R^1$ denotes a hydrogen atom, halogen atom or hydroxy group, lower alkyl group, lower alkoxy group or aryl group and R denotes a lower alkyl radical is condensed with a hydrazine derivative having the formula (III):

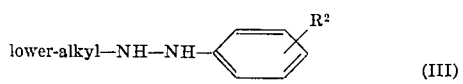

in which $R^2$ has the same meanings as $R^1$ and may be identical with or different from the same, followed by reaction of the condensation product formed with an alkanesulphonyl halide in the presence of a basic condensing agent, it is not the 4-benzyl-3-alkanesulphonamido-2-alkyl-1-phenylpyrazolin-5-one to be expected which is obtained but the position isomeric 4-benzyl-3-alkanesulphonamido-1-alkyl-2-phenyl-pyrazolin-5-one having the formula (I):

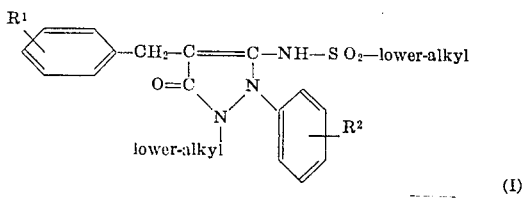

in which $R^1$ and $R^2$ have the above meanings.

The applicant himself originally regarded the compound obtained by the method described above as the 2-methyl-1-phenyl derivative because elementary analysis and solubility properties appeared to confirm the structural formula assumed. It was only subsequent processing and work of an analytic nature (inter alia by ultraviolet and infrared spectra) that it proved to be a position isomer, namely the 1-methyl-2-phenyl derivative.

The process for the production of the new compounds may be carried out as follows:

The ester and hydrazine components are mixed together and the mixture is slowly heated to a high temperature, for example 150°C. The addition of a basic condensing agent may be advantageous but is not necessary; alkali metal hydroxides, carbonates, hydrides, amides or alcoholates and also calcium oxide and tertiary organic amines, as for example pyridine, dimethylaniline or tetramethylurea are suitable as condensing agents. 2-methylphenylhydrazine is fairly sensitive in the form of the free base to atmospheric oxygen and moisture and is therefore advantageously stored in the form of a salt, for example the hydrochloride; if it is used in the reaction as a salt, a basic condensing agent has to be added in at least the stoichiometric amount. The condensation may be carried out without solvent or in an inert organic solvent; in the latter case it is preferred to use an anhydrous solvent, for example an aliphatic alcohol, an aliphatic, araliphatic or aromatic ether, or a hydrocarbons; it is not necessary for the condensation product to have good solubility in the solvent.

The initiation and progress of the condensation reaction may be followed by the escape of the alcohol formed and by thin layer chromatographic controls; in general it is concluded after a few hours to one day at elevated temperature. After the reaction mixture has been cooled, the pyrazolin-5-one derivative may be obtained in pure form by evaporating any solvent used followed by recrystallization.

Reaction of the 3-aminopyrazolin-5-one with the alkanesulphonyl halide is carried out in the presence of a basic condensing agent, the choice of reaction conditions being limited to those which leave the alkanesulphonyl halide intact; alkali metal hydroxides or carbonates, or caustoc alkali solutions or tertiary organic amines are suitable. An inert organic solvent as for example benzene, toluene, petroleum ether and the like, is used. According to a preferred procedure, the two reactants are dissolved in a halogenated aliphatic hydrocarbon such as chloroform or preferably methylene chloride and allowed to react for some time, for example a few hours, to form an intermediate complex before addition of condensing agent in portions is begun. The condensation starts with the addition of the condensing agent and procedures strongly exothermally. When the preferred reaction conditions just described are maintained, clearly higher yields are obtained than according to conventional methods, for example according to Schohe-Baumannn. Iso Isolation of the end product may be carriedout by adding water, separating and acidifying the aqueous alkaline phase and filtering off the product deposited. By evaporating the dried organic phase, any unreacted 3-aminopyrazoline-5-one may be recovered.

The new compounds form water-soluble salts with alkalies, for example caustic soda solution, caustic potash solution and the like.

The compounds are distinguished in experiments on animals by pronounced analgesic, antipyretic and antiphlogistic properties which are superior to those of known and more valuable pyrazole compounds and which make their use for the treatment of feverish and painful conditions of every genesis and also of inflammatory conditions including rheumatism as promising to be effective. These properties are explained in greater detail hereinafter, the new 1-methyl-2-phenyl derivative and the 2-methyl-1-ohenyl isomer being referred to by the short names CH 34 and RG 117.

(A) Formalin Peritontis in Rats

A dose of 75 mg/kg of CH 34 (dissolved as the sodium salt) administered subcutaneously to 16 rats decreases the amount of ascites caused by i.p. injection of formalin from 2.54 ml in the same size control group to 1.62 ml, i.e. by 36 percent (contrasted with 22 percent with the same dose of RB 117). The difference with a $p$ of 0.0002 is highly significant and is equivalent to the effect of 150 mg of phenylbutazone which in three experimental groups resulted in a decrease in the amount of ascites of from 32 to 35 percent.

(B) Rat Paw Edema:

A dose of 75 mg/kg of CH 34 (dissolved as the sodium salt) administered subcutaneously decreased rat paw edema produced by dextran in a statistically significant way (RG 117 is practically without effect in this test):

| Treatment | N | Foot volume and significance | | | | (p) | |
|---|---|---|---|---|---|---|---|
| | | after vol. 1 | 2 hours p | after 4 hours vol. 1 | p | after 6 hours vol. 1 | p |
| NaCl | 14 | 530 | — | 555 | — | 575 | — |
| CH 34 75 mg/kg | 14 | 399 | 0.02 | 453 | 0.05 | 464 | 0.14 |

(C) Passive Cutaneous Anaphylaxis:

CH 34 inhibits PCA induced by intracutaneous administration of rabbit antiserum against beef liver and i.v. application of beef liver extract in Pirbright guinea pigs by subcutaneous administration of one dose of 100 mg/kg (dissolved as the sodium salt). The untreated animals react under the test conditions with anaphylaxis indications down to a dilution of the serum of $10^{-3}$, whereas the treated animals exhibit the signs of a local anaphylaxis only at dilutions of $10^{-1}$.

| Animal No. | Reaction at | Treatment |
|---|---|---|
| 1 | $10^{-3}$ | none |
| 2 | $10^{-2}$ | none |
| 3 | $10^{-3}$ | none |
| 4 | $10^{-3}$ | none |
| 5 | $10^{-3}$ | none |
| 6 | $10^{-1}$ | CH 34, 100 mg/kg |
| 7 | $10^{-1}$ | CH 34, 100 mg/kg |
| 8 | $10^{-1}$ | CH 34, 100 mg/kg |
| 9 | $10^{-2}$ | CH 34, 100 mg/kg |
| 10 | $10^{-1}$ | CH 34, 100 mg/kg |

(D) Antipyretic Effect:

CH 34 also reveals an antipyretic effect. In the case of yeast fever in rats the effect occurs at a per os dose of about 300 mg/kg and is significant after three or four and half hours with $p$ values of 0.028 and 0.045.

(E) Acute Toxicity:

Acute toxicity tested on male NMRI mice (stemming from the stock of the National Medical Research Institute, USA) having body weights of from 29 to 36 g gave the following values:

| $DL_{50}$ | per os mg/kg | subcutaneously mg/kg | intravenously mg/kg |
|---|---|---|---|
| new compound | 2700 | 2200 | 1500 |
| RG 117 | 1450 | 1000 | 1000 |
| phenyl butazone* | 650 | — | 102 |
| amino-pyrin** | 1850 | 350 | 170 |

*W.Krohs and O.Hensel, Pyrazolone und Dioxopyrazolidine, Editio Cantor, Aulendorf 1961
**Handbook of Toxicology, volume I, Saunders Company, Philadelphia 1956.

The experimental results show that 4-benzyl-3-methanesulphonamido-1-methyl-2-phenylpyrazolin-5-one is suprisingly clearly superior to known used commercial preparations having the same effect direction both as regards the pharmacodynamic activity and as regards toxicity. The greater therapeutic breadth resulting therefrom leads to the expectation that the new compounds when used therapeutically for human beings will not exhibit, or will exhibit only to a lesser extent, those undesirable side effects associated with pyrazolinone derivatives already known. It is however also astonishing that the tested compound is even superior to the closely related 2-methyl-1-phenyl isomer in pharmacodynamic and toxicological respects although this belongs to the proved classic group of the 1-phenylpyrazolinones. The new compounds may therefore be claimed as the first valuable members of the 2-phenylpyrazolinones, which group has hitherto been little investigated because of their difficult chemical accessibility and in any case without visible pharmaceutical results.

The compounds may be processed with the conventional inert carrier substances and auxiliaries into preparations for oral or parenteral administration such as tablets, dragees, capsules, injection solutions and the like.

The following Examples illustrate the invention which is not however limited to the embodiments described.

EXAMPLE 1

20.3 g of ethyl benzylcyanoacetate (0.10 mole) and 13.5 g of 2-methylphenylhydrazine (about 0.11 mole) are mixed in a flash having distillation equipment and the mixture, while being gassed with nitrogen, is slowly heated on an oilbath to a reaction temperature of 150°C. Slight distillation soon begins and the heating is continued at this temperature for 15 hours and then cooled. The product solidifies to a yellow resinous material (28 g) having a melting point of 175° to 182°C. 25 g of this product is placed in 20 ml of ethanol and the mixture is heated under reflux until it has completely dissolved, when it is filtered and allowed to cool slowly to 0°C. 3-amino-4-benzyl-1-methyl-2-phenylpyrazolin-5-one begins to crystallize out immediately and after another five hours it is filtered off at 0°C, washed with a little ethyl acetate and dried in vacuo at 45°C. The substance melts at 191° to 192°C. The yield is 15 g (60 percent of the theory). A second portion of the compound (5 grams; total yield 80 percent) is obtained by concentration of the mother liquor on a rotating evaporator to half its volume, allowing it to cool to 0°C and filtering. The yield may be further increased somewhat by further processing of the mother liquor.

14 g of the pyrazolinone derivative (about 0.05 mole) is dissolved in 100 ml of methylene chloride and 17.2 g of distilled methanesulphonyl chloride (about 0.15 mole) and the solution is heated under reflux (41°C) for 2½ hours. Then 30 g of finely ground sodium hydroxide is added in portions within 1 hour and the mixture is kept refluxing for another 2 hours; soon after the first or second addition, a strong exothermic reaction (foaming) is observed. 100 ml of water is added to form a clear two-phase system which is separated in a separating funnel. The methylene chloride phase is washed twice, each time with 10 ml of water, and the aqueous alkaline phase is washed twice, each time with 10 ml of methylene chloride. By evaporating the combined and dried methylene chloride phases on a rotating evaporator, 4 g of unreacted 3-amino-4-benzyl-1-methyl-2-phenylpyrazolin-5-one (about 30 percent of the batch) is recovered.

The aqueous alkaline solutions are combined, cooled to 0°C with ice and adjusted to a pH value of 4 to 5 by adding 10 ml of glacial acetic acid while stirring vigorously. A white product is immediately precipitated which after having stood for two minutes at 0°C is filtered off, washed twice, each time with 10 ml of distilled water and dried in a drying cabinet at 60°C in vacuo. 12 g (about 70 percent of the theory) of crude 4-benzyl-3-methanesulphonamido-1-methyl-2-phenylpyrazolin-5-one is obtained. For recrystallisation the compound is heated under reflux in six times the amount of ethanol, the resultant solution is filtered while hot and allowed to cool slowly to room temperature, the substance thus being deposited in beautiful colorless crystals. After having stood for 10 hours at 0°C, the crystals are filtered off, washed with a little cold ethanol and dried in vacuo at 100°C. The compound melts at 214° to 215° C (apparatus according to Tottoli).

Analysis ($C_{18}H_{19}N_3O_3S$  molecular weight: 357.4)
calculated    C 60.49%    H 5.36%    N 11.76%
found:        60.58%      5.54%      11.60%

The substance has a bitter taste and is practically insoluble in water, diethyl ether, acetone or ethyl acetate; it dissolves to the extent of less than 0.5 percent in methanol or ethanol at 20°C but has good solubility in caustic soda solution with the formation of the sodium salt.

EXAMPLE 2 a. 18.9 g of methyl benzylcyanoacetate and 12.2 g of 2-methylphenylhydrazine are mixed, heated to about 130° to 150°C and kept at this temperature for 24 hours while stirring. After cooling, a little dilute hydrochloric acid is added, the whole is extracted with chloroform, separated and caustic soda solution is added to the aqueous solution until an alkaline reaction to phenolphthaleine is obtained. After standing for a long time, if necessary with strong cooling, the product is filtered off, washed and dried. A yellowish compound is obtained which it is difficult to purify.

b. The compound which has been dried well in vacuo has methanesulphonyl chloride and pyridine added to it. After the reaction it is poured into alcoholic ice-water, clarified, filtered and the filtrate acidified. The precipitate formed is filtered off and, after it has been purified in the same way as in example 1, it gives 4-benzyl-3-methanesulphonamido-1-methyl-2-phenyl-pyrazolin-5-one having a melting point of 214° to 215°C after it has been recrystallized from ethanol.

I claim:
1. A process for the production of pyrazolinone derivatives having the formula (I):

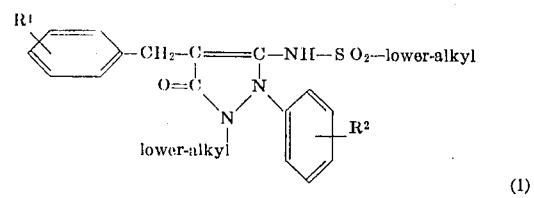

in which $R^1$ and $R^2$ may be identical or different and each denotes a hydrogen atom or halogen atom or a hydroxy, lower alkyl or lower alkoxy group or alkali metal salts thereof which comprises condensing a benzylcyanoacetic ester having the formula (II):

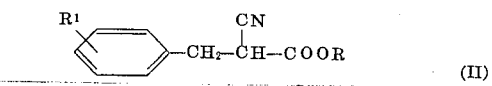

in which $R^1$ has the above meaning and R denotes a lower alkyl radical with a hydrazine derivative having the formula (III):

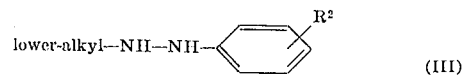

in which $R^2$ has the above meaning and reacting the condensation product in the presence of a basic condensing agent with a lower alkanesulphonyl halide.

2. A process as claimed in claim 1 wherein the condensation of the benzylcyanoacetic ester with the hydrazine derivative is carried out with a basic condensing agent.

3. A process as claimed in claim 2 wherein the basic condensing agent used is an alkali metal hydroxide, alkali metal carbonate, alkali metal hydride, alkali metal amide, alkali metal alcoholate, calcium oxide or a tertiary organic amine.

4. A process as claimed in claim 1 wherein the condensation product and the alkanesulphonyl halide are allowed to react with each other in a halogenated aliphatic hydrocarbon prior to the addition of the basic condensing agent.

5. A process as claimed in claim 4 wherein the halogenated aliphatic hydrocarbon used is methylene chloride.

6. A process as claimed in claim 4 wherein the halogenated aliphatic hydrocarbon used is chloroform.

7. A process as claimed in claim 1 wherein the basic condensing agent used is an alkali metal hydroxide, an alkali metal carbonate, a caustic alkali solution or a tertiary organic amine.

8. A process as claimed in claim 1 wherein the compound obtained is converted into its sodium or potassium salt.

* * * * *